(12) United States Patent
Sato et al.

(10) Patent No.: US 8,877,405 B2
(45) Date of Patent: Nov. 4, 2014

(54) FUEL CELL INCLUDING MEMBRANE ELECTRODE ASSEMBLY TO MAINTAIN HUMIDITY CONDITION

(75) Inventors: Yuusuke Sato, Tokyo (JP); Kei Matsuoka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1010 days.

(21) Appl. No.: 12/207,662

(22) Filed: Sep. 10, 2008

(65) Prior Publication Data

US 2009/0081488 A1    Mar. 26, 2009

(30) Foreign Application Priority Data

Sep. 25, 2007   (JP) ................................ P2007-247746

(51) Int. Cl.
*H01M 8/10*    (2006.01)
(52) U.S. Cl.
USPC ........... 429/483; 429/474; 429/452; 429/457; 429/458; 429/459; 429/512
(58) Field of Classification Search
USPC .......... 429/474, 452, 457, 458, 459, 12, 483, 429/512
See application file for complete search history.

(56) References Cited

U.S. PATENT DOCUMENTS

| | | | | |
|---|---|---|---|---|
| 4,175,165 A | * | 11/1979 | Adlhart | 429/457 |
| 4,339,322 A | * | 7/1982 | Balko et al. | 204/255 |
| 4,360,577 A | * | 11/1982 | Klootwyk | 429/209 |
| 4,514,475 A | * | 4/1985 | Mientek | 429/460 |
| 4,515,871 A | * | 5/1985 | Shirogami et al. | 429/454 |
| 4,554,225 A | * | 11/1985 | Sounai et al. | 429/474 |
| 4,708,916 A | * | 11/1987 | Ogawa et al. | 429/459 |
| 4,729,932 A | * | 3/1988 | McElroy | 429/414 |
| 4,766,043 A | * | 8/1988 | Shirogami et al. | 429/457 |
| 4,769,297 A | * | 9/1988 | Reiser et al. | 429/413 |
| 5,227,256 A | * | 7/1993 | Marianowski et al. | 429/423 |
| 5,342,706 A | * | 8/1994 | Marianowski et al. | 429/460 |
| 5,346,780 A | * | 9/1994 | Suzuki | 429/480 |
| 6,291,094 B1 | * | 9/2001 | Yoshimura et al. | 429/492 |
| 6,383,677 B1 | * | 5/2002 | Allen | 429/454 |
| 6,803,139 B2 | * | 10/2004 | Saito et al. | 429/457 |
| 6,849,355 B2 | * | 2/2005 | Wakahoi et al. | 429/434 |
| 6,924,055 B2 | | 8/2005 | Hirsch et al. | |
| 6,939,638 B2 | * | 9/2005 | Saito et al. | 429/454 |

(Continued)

FOREIGN PATENT DOCUMENTS

| | | |
|---|---|---|
| JP | 3-266365 A | 11/1991 |
| JP | 6-267559 A | 9/1994 |
| JP | 8-17452 A | 1/1996 |
| JP | 2007-207731 A | 8/2007 |

OTHER PUBLICATIONS

U.S. Appl. No. 12/342,268, filed Dec. 23, 2008, Yagi, et al.

(Continued)

*Primary Examiner* — Caleb Henry
(74) *Attorney, Agent, or Firm* — Oblon, Spivak, McClelland, Maier & Neustadt, L.L.P.

(57) ABSTRACT

A fuel cell includes: a membrane electrode assembly containing an anode and a cathode which are disposed opposite to one another via an electrolytic membrane; an anode channel plate adjacent to the anode and supplying a prescribed fuel to the anode; and a cathode channel plate adjacent to the cathode, supplying air to the cathode and containing a platy member which is elongated in a direction different from a supplying direction of the air to the cathode.

20 Claims, 4 Drawing Sheets

(56) References Cited

U.S. PATENT DOCUMENTS

| | | | |
|---|---|---|---|
| 7,294,424 B2* | 11/2007 | Haltiner, Jr. | 429/465 |
| 7,566,512 B2* | 7/2009 | Bednarz et al. | 429/457 |
| 7,585,582 B2* | 9/2009 | Chen et al. | 429/415 |
| 7,597,990 B2* | 10/2009 | Sato | 429/422 |
| 7,709,130 B2* | 5/2010 | Sato et al. | 429/515 |
| 7,919,214 B2* | 4/2011 | Xu et al. | 429/519 |
| 8,034,505 B2* | 10/2011 | Kobuchi et al. | 429/457 |
| 8,034,510 B2* | 10/2011 | Moteki et al. | 429/514 |
| 8,039,154 B2* | 10/2011 | Morita et al. | 429/428 |
| 2002/0028368 A1* | 3/2002 | Saito et al. | 429/34 |
| 2003/0031912 A1* | 2/2003 | Saito et al. | 429/34 |
| 2004/0013928 A1* | 1/2004 | Yamauchi et al. | 429/34 |
| 2005/0191539 A1* | 9/2005 | Yoshioka et al. | 429/38 |
| 2005/0196660 A1* | 9/2005 | Tsushima et al. | 429/34 |
| 2005/0214622 A1* | 9/2005 | Yoshioka et al. | 429/38 |
| 2006/0086041 A1* | 4/2006 | Kubota et al. | 44/451 |
| 2006/0204819 A1* | 9/2006 | Murakami et al. | 429/34 |
| 2006/0210860 A1* | 9/2006 | Inagaki et al. | 429/34 |
| 2007/0072051 A1* | 3/2007 | Sato | 429/38 |
| 2007/0264552 A1* | 11/2007 | Hayamizu et al. | 429/30 |
| 2008/0026279 A1* | 1/2008 | Kobuchi et al. | 429/35 |
| 2008/0138668 A1* | 6/2008 | Akita et al. | 429/12 |
| 2008/0166617 A1* | 7/2008 | Shizuku et al. | 429/30 |
| 2008/0166621 A1* | 7/2008 | Sano et al. | 429/34 |
| 2008/0166622 A1* | 7/2008 | Shizuku et al. | 429/35 |
| 2008/0233450 A1 | 9/2008 | Yagi et al. | |
| 2008/0241635 A1 | 10/2008 | Sato et al. | |
| 2008/0248359 A1 | 10/2008 | Kawano et al. | |
| 2009/0023046 A1 | 1/2009 | Wang et al. | |
| 2010/0233566 A1 | 9/2010 | Sato et al. | |

OTHER PUBLICATIONS

Japanese Office Action Issued Jan. 22, 2013 in Patent Application No. 2007-247746 (with English translation).

* cited by examiner

Supplying direction of air to cathode

FUEL CELL INCLUDING MEMBRANE ELECTRODE ASSEMBLY TO MAINTAIN HUMIDITY CONDITION

CROSS-REFERENCE TO RELATED APPLICATIONS

This application is based upon and claims the benefit of priority from the prior Japanese Patent Application No. 2007-247746, filed on Sep. 25, 2007; the entire contents of which are incorporated herein by reference.

BACKGROUND OF THE INVENTION

1. Field of the Invention

The present invention relates to a fuel cell suitable for a direct fuel cell. 2. Description of the Related Art In a solid polymer fuel cell (PEM) using hydrogen as fuel or a direct methanol fuel cell (DMFC), a plurality of cells are stacked one another. Each cell is configured such that a membrane electrode assembly (MEA) is sandwiched by an anode channel plate and a cathode channel plate. In the membrane electrode assembly, an anode catalytic layer and an anode gas diffusion layer are formed at the anode side of the solid polymer proton conduction membrane and a cathode catalytic layer and a cathode gas diffusion layer are formed at the cathode of the solid polymer proton conduction membrane. In the direct methanol fuel cell, a mixed solution of water and methanol is supplied to the anode and an air is supplied to the cathode.

In the anode of the direct methanol fuel cell, the reaction is caused as follow.

$$CH_3OH + H_2O \rightarrow CO_2 + 6H^+ + 6e^- \quad (1)$$

As apparent from equation (1), $CO_2$ is generated in the anode. In the cathode of the direct methanol fuel cell, the reaction is caused as follows.

$$3/2 O_2 + 6H^+ + 6e^- \rightarrow 3H_2O \quad (2)$$

As apparent from equation (2), $H_2O$ is generated in the cathode.

The mixed solution made of $CO_2$, $H_2O$ and methanol not reacted in the anode is converted into a gas/liquid phase flow and then, discharged from the anode. The gas/liquid phase flow, discharged from the anode, is supplied into a gas/liquid separator disposed at the flow path in the side of the outlet of the anode, and then, separated into the corresponding gas and liquid. The separated liquid is circulated to a mixing tank and the like via a recovering path, and the separated gas is discharged to air (refer to Reference 1).

[Reference 1] U.S. Pat. No. 6,924,055

In the anode of the fuel cell using hydrogen as fuel, the reaction is caused as follows.

$$H_2 \rightarrow 2H^+ + 2e^- \quad (3)$$

In the cases that the mixed solution of water and methanol is supplied to the anode in the direct methanol fuel cell and the hydrogen is supplied to the anode in the fuel cell using hydrogen as fuel, it is required air is supplied to the cathode sufficiently enough to cause the electric power generation in accordance to the equations (1) to (3). As of now, in this point of view, air is supplied by means of pump. In this case, however, there are shown some problems that the pump is required to be enlarged, generates noise and increases the electric power consumption.

Alternatively, the membrane electrode assembly is dried when air is supplied so that the humidity condition of the membrane electrode is changed so as to unstablize the performance of the electric power generation.

BRIEF SUMMARY OF THE INVENTION

It is an object of the present invention to provide a fuel cell which can reduce noise in the use of (a) pump(s), electric power consumption and stabilize the performance of electric power generation through the maintenance of the humidity condition of a membrane electrode.

In order to achieve the above object, an aspect of the present invention relates to a fuel cell, including: a membrane electrode assembly containing an anode and a cathode which are disposed opposite to one another via an electrolytic membrane; an anode channel plate adjacent to the anode and supplying a prescribed fuel to the anode; and a cathode channel plate adjacent to the cathode, supplying air to the cathode and containing a platy member which is elongated in a direction different from a supplying direction of the air to the cathode.

Another aspect of the present invention relates to a fuel cell, including: a plurality of membrane electrode assemblies, each assembly containing an anode and a cathode which are disposed opposite to one another via an electrolytic membrane; a plurality of anode channel plates, each anode channel plate being adjacent to a corresponding anode of the plurality of membrane electrode assemblies and supplying a prescribed fuel to the corresponding anode thereof; and a plurality of cathode channel plates, each cathode channel plate being adjacent to a corresponding cathode of the plurality of membrane electrode assemblies, supplying air to the corresponding cathode and containing a platy member which is elongated in a direction different from a supplying direction of the air to the cathode, wherein a plurality of units are stacked one another, thereby constituting a stacking structure, each unit including the membrane electrode assembly, the anode channel plate and the cathode channel plate.

Still another aspect of the present invention relates to a fuel cell, including: a plurality of membrane electrode assemblies, each assembly containing an anode and a cathode which are disposed opposite to one another via an electrolytic membrane; a plurality of anode channel plates, each anode channel plate being adjacent to a corresponding anode of the plurality of membrane electrode assemblies and supplying a prescribed fuel to the corresponding anode; and a plurality of cathode channel plates, each cathode channel plate being adjacent to a corresponding cathode of the plurality of membrane electrode assemblies, supplying air to the corresponding cathode and containing a platy member which is elongated in a direction different from a supplying direction of the air to the cathode, wherein a plurality of units are stacked one another, thereby constituting a stacking structure, each unit including the anode channel plate, the membrane electrode assembly, the cathode channel plate, the membrane electrode assembly and the anode channel plate which are subsequently stacked.

A further aspect of the present invention relates to a fuel cell, including: a plurality of membrane electrode assemblies, each assembly containing an anode and a cathode which are disposed opposite to one another via an electrolytic membrane; a plurality of anode channel plates, each anode channel plate being adjacent to a corresponding one of the membrane electrode assemblies and supplying a prescribed fuel to a corresponding anode of the plurality of membrane electrode assemblies ; and a plurality of cathode channel plates, each cathode channel plate being disposed opposite to a corresponding one of the plurality of anode channel plates via the corresponding one of the membrane electrode assemblies, supplying air to a corresponding cathode of the plurality of membrane electrode assemblies and containing a platy member which is elongated in a direction different from a supplying direction of the air to the cathode, wherein a plurality of units are arranged on the same surface level, each unit including the membrane electrode assembly, the anode channel plate and the cathode channel plate which are stacked.

According to the aspects can be provided provide a fuel cell which can reduce noise in the use of (a) pump(s), electric power consumption and stabilize the performance of electric power generation through the maintenance of the humidity condition of a membrane electrode.

DETAILED DESCRIPTION OF THE INVENTION

Figure 1:
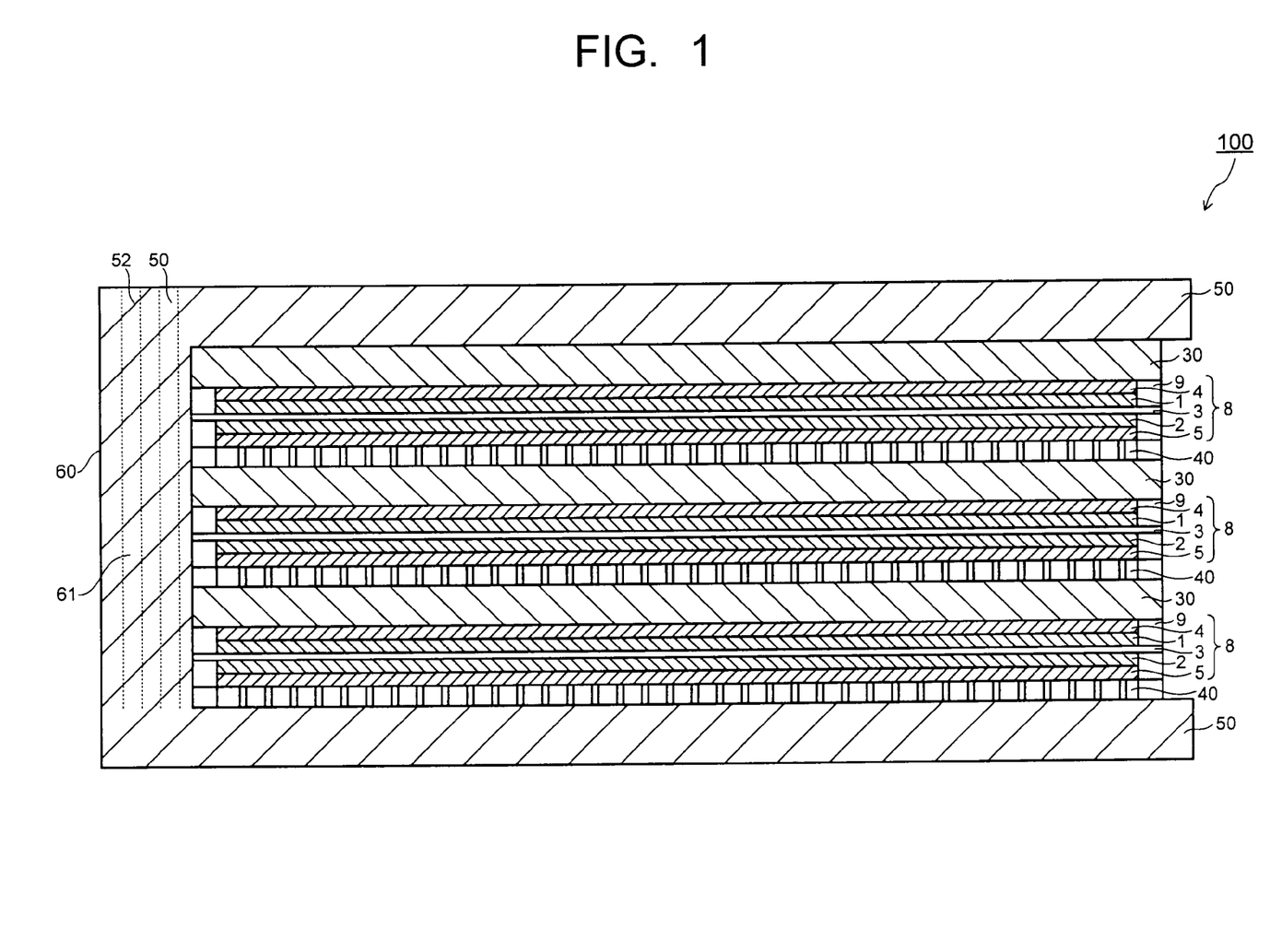
FIG. 1 is a cross sectional view schematically showing the structure of a fuel cell according to an embodiment.
Figure 2:
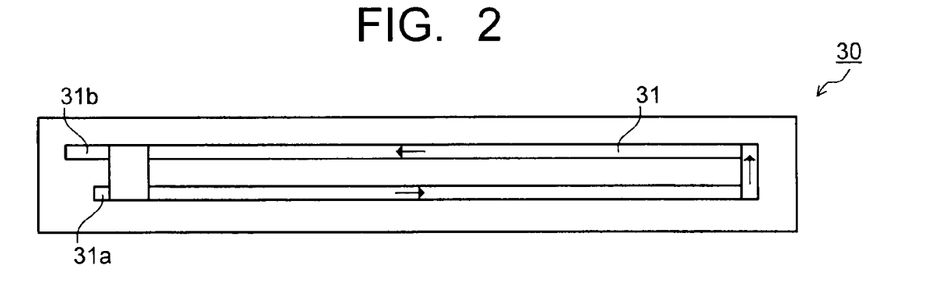
FIG. 2 is a plan view showing the anode channel plate of the fuel cell in FIG. 1.
Figure 3:
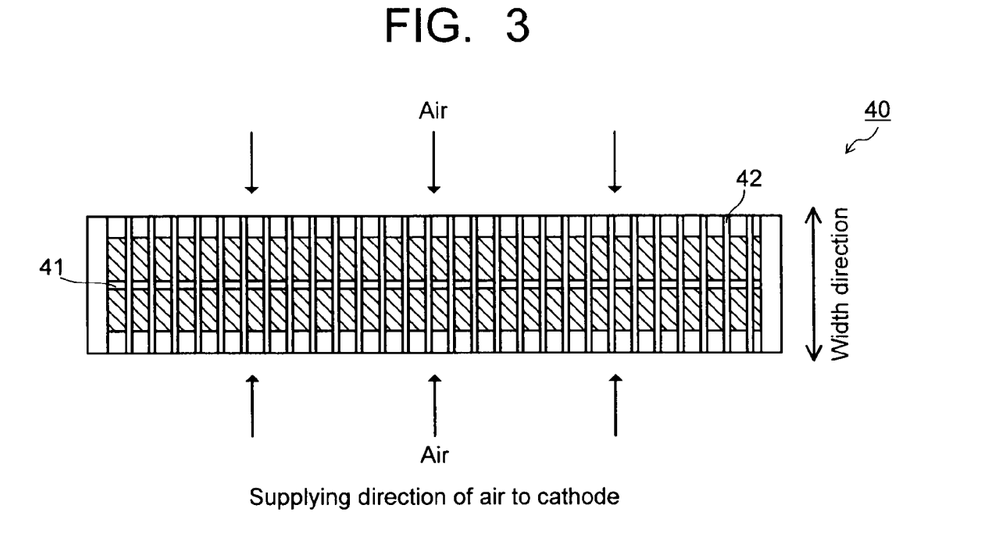
FIG. 3 is a plan view showing the cathode channel plate of the fuel cell in FIG. 1.

Hereinafter, the present invention will be described in detail with reference to the drawings.
(First Embodiment)
FIG. 1 is a cross sectional view schematically showing the structure of a fuel cell according to a first embodiment. FIG. 2 is a plane view showing the anode channel plate of the fuel cell in FIG. 1. FIG. 3 is a plan view showing the cathode channel plate of the fuel cell in FIG. 1.

The fuel cell 100 shown in FIG. 1 is configured so as to contain three units which are stacked one another, thereby constituting a stacking structure. Each unit includes a membrane electrode assembly (MEA) 8 containing an electrolyte membrane 3, an anode (anode catalytic layer 1 and an anode gas diffusion layer 4) and a cathode (cathode catalytic layer 2 and a cathode gas diffusion layer 5) which are opposite to one another via the electrolyte membrane 3, an anode channel plate 30 which is disposed adjacent to the anode gas diffusion layer 4 and functions as supplying a prescribed fuel to the anode, and a cathode channel plate 40 which is disposed opposite to the anode channel plate 30 via the membrane electrode assembly 8.

Each unit is also configured so as to seal the membrane electrode assembly 8 by the anode channel plate 30 and the cathode channel plate 40 with gaskets 9.

A pair of clamping plates 50 are provided on the one end and the opposite end of the stacking structure, respectively, so that the three units of the stacking structure are clamped and held vertically. In this case, each unit is also clamped and held vertically by the pair of clamping plates 50. In this embodiment, since electric power generated at the fuel cell 100 is taken out outside via the clamping plates 50, the clamping plates 50 function as electrodes, respectively. In this point of view, therefore, the clamping plates 50 are made of electric conductive material.

Then, a fuel supplying member 60 is provided at one end of each unit between the adjacent anode channel plate 30 of the corresponding units. In the fuel supplying member 60, a longitudinal fuel supplying path 61 is formed so as to supply a predetermined fuel to each unit. As described hereinafter, since the electric power generated at the fuel cell 100 is taken out via the clamping plates 50, the anode channel plate 30 and the cathode channel plate 40 in each unit are also made of electric conducting material in addition to the clamping plates 50.

The membrane electrode assembly 8 includes the electrolytic membrane 3 made of proton conductive solid polymer membrane, the anode catalytic layer 1 and the cathode catalytic layer 2 which are formed by applying catalytic films on the main surface of the electrolytic membrane 3, the anode diffusion layer 4 and the cathode diffusion layer 5 which are formed on the outer surfaces of the anode catalytic layer 1 and the cathode catalytic layer 2, respectively.

The electrolytic membrane 3 may be made of a copolymer of tetrafluoroethylene and perfluorovinylether sulfonic acid. As the copolymer, Nafion (trade name) made by US DuPont Corp. Ltd may be exemplified. The anode catalytic layer 1 may contain PtRu and the cathode catalytic layer 2 may contain Pt or the like. The anode-gas diffusion layer 4 and the cathode gas diffusion layer 5 may be made of carbon paper or the like.

Not shown in FIG. 1, an anode microporous layer with a thickness of several ten μm and made of carbon may be provided between the anode catalytic layer 1 and the anode gas diffusion layer 4. The anode microporous layer is water-repellent finished and the diameter of each pore in the anode microporous layer is set in the order of submicrometer. Alternatively, a cathode microporous layer with a thickness of several ten μm and made of carbon may be provided between the cathode catalytic layer 2 and the cathode gas diffusion layer 5. In this case, the diameter of each pore in the cathode microporous layer is set in the order of submicrometer.

As shown in FIG. 2, the anode channel plate 30 includes a fuel supplying path 31 so that a prescribed fuel is taken in the fuel supplying path 31 from the fuel inlet 31a, and then, taken out from the fuel outlet 31b after circulated through the fuel supplying path 31. Since the fuel supplying path 31 is contacted with the anode of the membrane electrode assembly 8, the fuel is supplied to the anode, that is, the anode catalytic layer 1 while the fuel is passed through the fuel supplying path 31.

The fuel is supplied into the anode channel plate 30 per unit from the corresponding fuel inlet 31a through the longitudinal fuel supplying path 61 formed through the clamping plate 50 and the fuel supplying members 60.

As shown in FIG. 3, the cathode channel plate 40 includes a platy member 41 which is disposed at the center in the width direction thereof and elongated along the long direction thereof, and a plurality of electrode plates 42 which are formed orthogonal to the platy member 41. As a result, the platy member 41 and the electrode plates 42 are arranged in comb-shape. The height of the platy member 41 is set equal to the heights of the electrode plates 42 so that the platy member 41 and the electrode plates 42 can be contacted with the cathode, that is, the cathode gas diffusion layer 5 when the cathode channel plate 40 is incorporated in the corresponding unit of the fuel cell 100.

As shown in FIG. 3, air to be supplied to the cathode is taken in along the electrode plates 42 of the cathode channel plate 40. In this case, however, since the platy member 41 is provided in the cathode channel plate 40, the air can be retained in the cathode channel plate 40, not therethrough. Therefore, oxygen originated from the air is supplied to the cathode per unit in the fuel cell 100 in FIG. 1 through the diffusion of the oxygen in the cathode channel plate 40.

The supply of the oxygen to the cathode is conducted dominantly through the diffusion of the oxygen in the cathode channel plate 40. Therefore, if the concentration of the oxygen at the air inlet of the cathode channel plate 40 can be maintained similar to the concentration of oxygen in air by means of air blow with a fan or the like, no pump is required. As a result, the space for accommodating the pump is not required, and no noise and no electric power consumption, originated from the use of the pump, are not caused. In this embodiment, since the oxygen is supplied to the cathode through diffusion, the resultant moisture generated at the cathode is discharged from the cathode through diffusion. As a result, the cathode can be moisturized while the oxygen is supplied to the cathode so that the membrane electrode assembly 8 contacting with the cathode channel plate 40 can be also moisturized under no dry condition and thus, the performance of electric power generation in the fuel cell 100 can be stabilized.

In this embodiment, the electric power generated per unit is collected at the platy member 41 and the electrode plate 42 in the cathode channel plate 40 and then, taken out via the clamping members 50. In order to enhance the supplying degree of the air, it is desired to increase the distance between the adjacent electrode plates 42. In this case, ordinarily, the electric collection resistance is increased, but in this embodiment, since the platy member 41 is provided, the electric collection resistance can not be increased even though the distance between the adjacent electrode plates 42 is increased. In view of the balance of the reduction in electric collection resistance and the enhancement of the supplying degree of the air, the platy member 41 is preferably disposed at the center in the width direction of the cathode channel plate 40.

Figure 4:
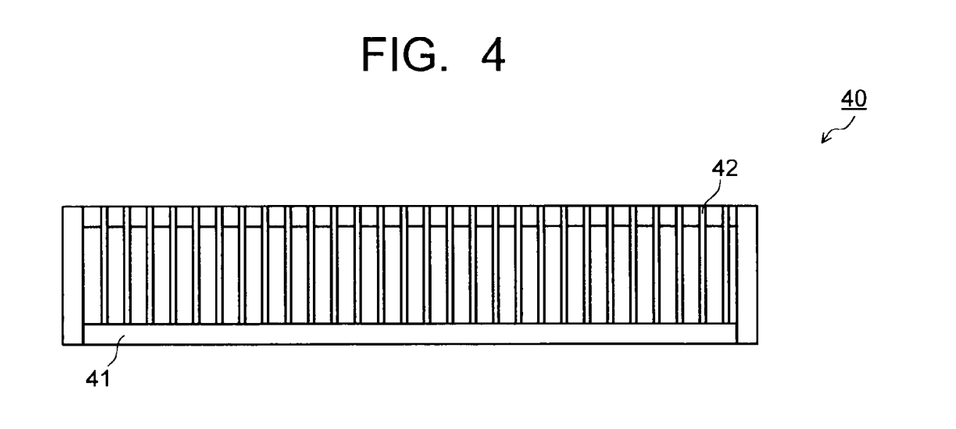
FIG. 4 is also a plan view showing the cathode channel plate of the fuel cell in FIG. 1.

In the cathode channel plate 40, the platy member 41 may be provided at the edge of the cathode channel plate 40 in the width direction thereof as shown in FIG. 4. In this case, the supply of the oxygen to the cathode is also conducted dominantly through the diffusion of the oxygen in the cathode channel plate 40. Therefore, since no pump is required, the space for accommodating the pump is not required, and no noise and no electric power consumption, originated from the use of the pump, are not caused. Then, since the cathode can be moisturized while the oxygen is supplied to the cathode so that the membrane electrode assembly 8 contacting with the cathode channel plate 40 can be also moisturized under no dry condition and thus, the performance of electric power generation in the fuel cell 100 can be stabilized.

As the fuel to be supplied to the anode, hydrogen or liquid fuel such as methanol aqueous solution can be exemplified.
(Second Embodiment)

Figure 5:
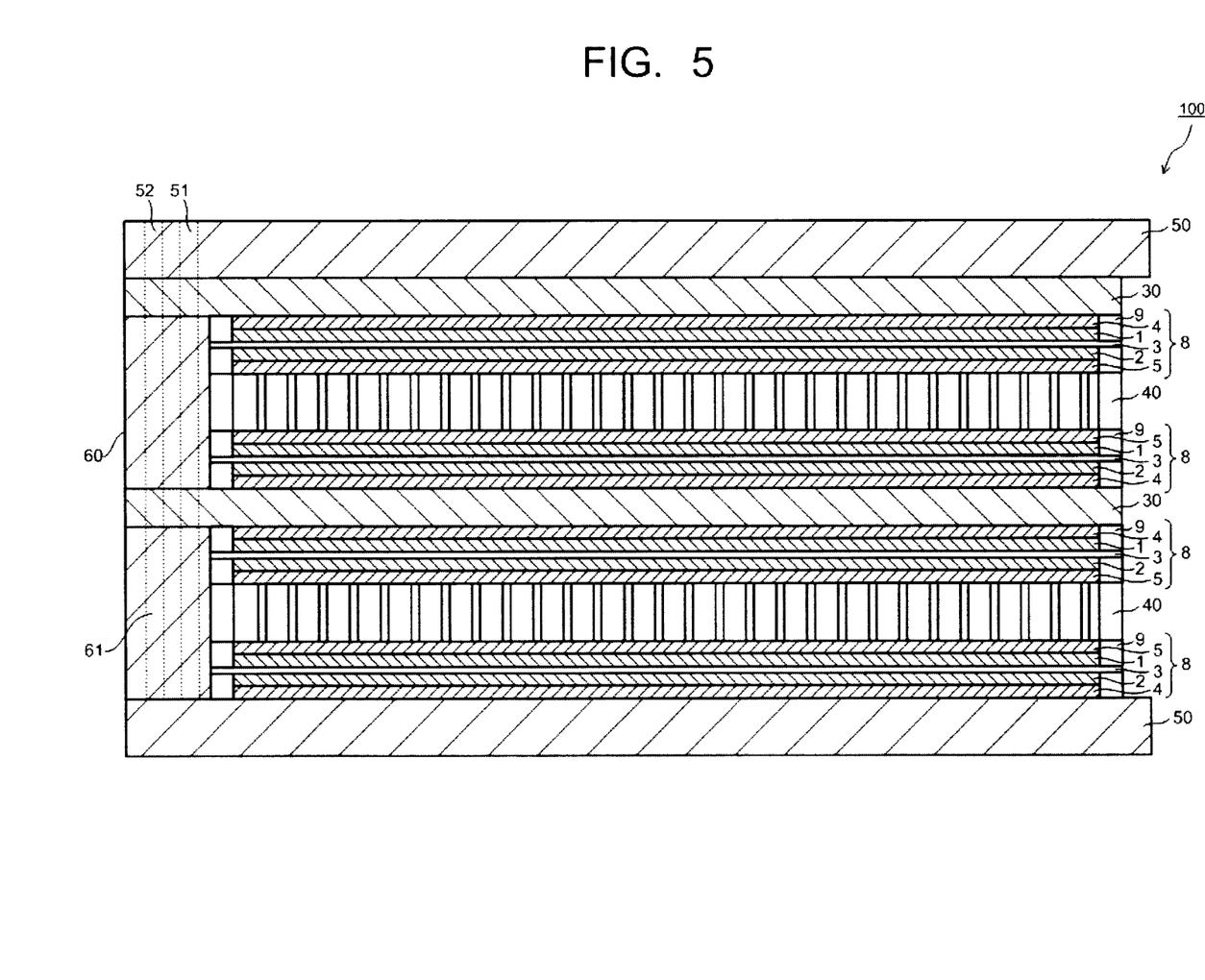
FIG. 5 is a cross sectional view showing the structure of a fuel cell according to another embodiment.

FIG. 5 is a cross sectional view schematically showing the structure of a fuel cell according to a second embodiment. The fuel cell in this embodiment is configured similar to the fuel cell in the first embodiment except that the stacking structure made of the membrane electrode assembly, the anode channel plate and the cathode channel plate in this embodiment is different from the one in the first embodiment. Therefore, the constituent components such as the anode channel plate and the cathode channel plate in this embodiment are configured similar to the ones in the first embodiment. In this embodiment, therefore, explanation is centered on the stacking structure of the fuel cell. Like or corresponding constituent components are designated by the same numeral references through FIGS. 1 to 5.

The fuel cell 100 shown in FIG. 5 is configured so as to contain two units which are stacked one another, thereby constituting a stacking structure. Each unit includes the membrane electrode assembly (MEA) 8 containing the electrolyte membrane 3, the anode (anode catalytic layer 1 and an anode gas diffusion layer 4) and the cathode (cathode catalytic layer 2 and a cathode gas diffusion layer 5) which are opposite to one another via the electrolyte membrane 3, the anode channel plate 30 which is disposed adjacent to the anode gas diffusion layer 4 and functions as supplying a prescribed fuel to the anode, and the cathode channel plate 40 which is disposed opposite to the anode channel plate 30 via the membrane electrode assembly 8. One unit is defined as a stacking structure made of the anode channel plate 30, the membrane electrode assembly 8, the cathode channel plate 40, the membrane electrode assembly 8, and the anode channel plate 30 which are subsequently stacked.

Each unit is also configured so as to seal the membrane electrode assembly 8 by the anode channel plate 30 and the cathode channel plate 40 with gaskets 9.

The pair of clamping plates 50 are provided on the one end and the opposite end of the stacking structure of the fuel cell 100, respectively, so that the two units of the stacking structure is clamped and held vertically. In this case, each unit is also clamped and held vertically by the pair of clamping plates 50. An electric collection structure (not shown) is provided in the anode channel plate 30 and the electric power collected at the electric collection structure is taken out via a terminal (not shown) attached thereto while the electric resistance of the electric collection structure is set high in the thickness direction thereof. In this case, the terminal provided at the anode channel plate 30 is connected with the terminal provided at the cathode channel plate 40.

Then, the fuel supplying member 60 is provided at one end of each unit between the adjacent anode channel plates 30 of the corresponding units. In the fuel supplying member 60, the longitudinal fuel supplying path 61 is formed so as to supply a prescribed fuel to each unit. In this embodiment, since the electric power generated at the fuel cell 100 is taken out via the fuel supplying member 60 and the clamping plates 50, the fuel supplying member 60 is also made of electric conducting material in addition to the clamping plates 50.

The membrane electrode assembly 8 includes the electrolytic membrane 3 made of proton conductive solid polymer membrane, the anode catalytic layer 1 and the cathode catalytic layer 2 which are formed by applying catalytic pastes on the main surface of the electrolytic membrane 3, the anode diffusion layer 4 and the cathode diffusion layer 5 which are formed on the outer surfaces of the anode catalytic layer 1 and the cathode catalytic layer 2, respectively.

The electrolytic membrane 3 may contain a copolymer of tetrafluoroethylene and perfluorovinylether sulfonic acid. As the copolymer, Nafion (trade name) made by US DuPont Corp. Ltd may be exemplified. The anode catalytic layer 1 may contain PtRu and the cathode catalytic layer 2 may contain Pt or the like. The anode gas diffusion layer 4 and the cathode gas diffusion layer 5 may be made of carbon paper or the like.

Not shown in FIG. 5, the anode microporous layer with a thickness of several ten μm and made of carbon may be provided between the anode catalytic layer 1 and the anode gas diffusion layer 4. Moreover, the cathode microporous layer with a thickness of several ten μm and made of carbon may be provided between the cathode catalytic layer 2 and the cathode gas diffusion layer 5. In this case, the diameter of each pore in the cathode microporous layer is set in the order of submicrometer.

The fuel is supplied into the anode channel plate 30 per unit from the corresponding fuel inlet 31a through the longitudinal fuel supplying path 61 formed through the clamping plate 50 and the fuel supplying members 60.

In this embodiment, the cathode channel plate 40 can be configured as shown in FIG. 3 or 4. Therefore, the supply of the oxygen to the cathode is conducted dominantly through the diffusion of the oxygen in the cathode channel plate 40. In this point of view, if the concentration of the oxygen at the air inlet of the cathode channel plate 40 can be maintained similar to the concentration of oxygen in air by means of air blow with a fan or the like, no pump is required. As a result, the space for accommodating the pump is not required, and no noise and no electric power consumption, originated from the use of the pump, are not caused. In this embodiment, since the oxygen is supplied to the cathode through diffusion, the resultant moisture generated at the cathode is discharged from the cathode through diffusion. As a result, the cathode can be moisturized while the oxygen is supplied to the cathode so that the membrane electrode assembly 8 contacting with the cathode channel path 40 can be also moisturized under no dry condition and thus, the performance of electric power generation in the fuel cell 100 can be stabilized.

In this embodiment, the electric power generated per unit is collected at the platy member 41 and the electrode plate 42 in the cathode channel plate 40 and then, taken out via the fuel supplying member 60 and the clamping members 50.

As the fuel to be supplied to the anode, hydrogen or liquid fuel such as methanol aqueous solution can be exemplified.

(Third Embodiment)

Figure 6:
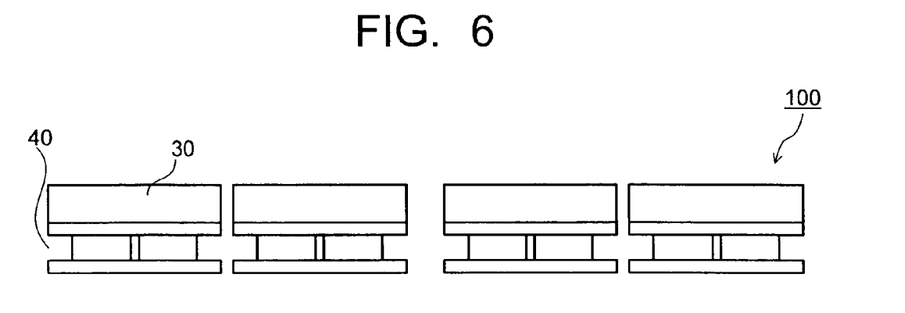
FIG. 6 is a cross sectional view showing the structure of a fuel cell according to still another embodiment.
Figure 7:
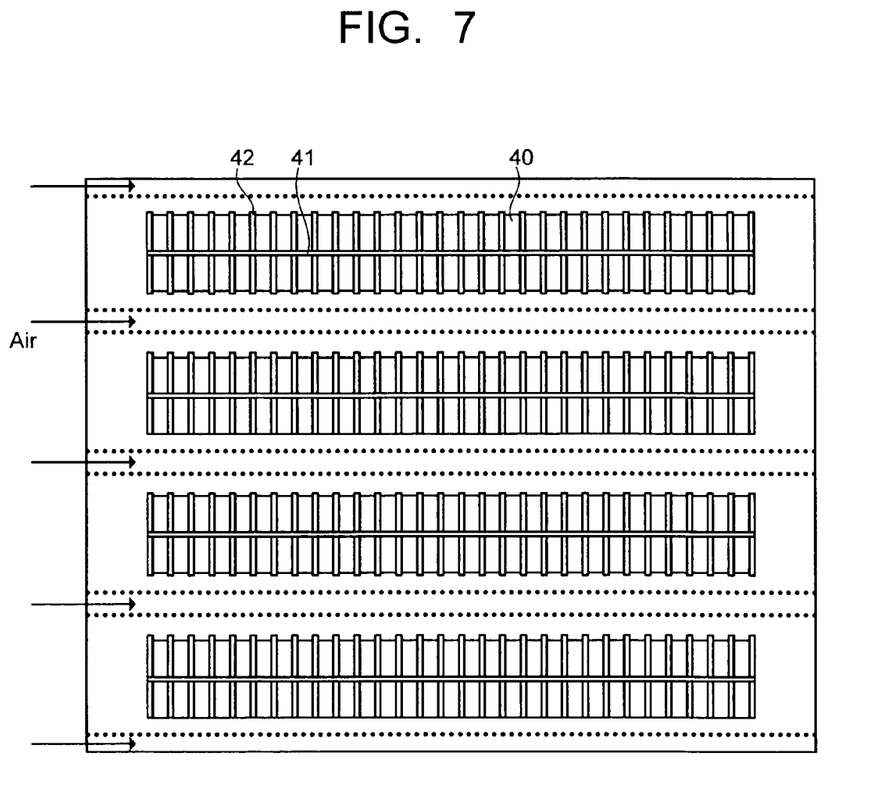
FIG. 7 is a plan view showing the arrangement of the cathode channel plate of the fuel cell in FIG. 6.

FIG. 6 is a cross sectional view showing the structure of a fuel cell according to still another embodiment. FIG. 7 is a plane view showing the arrangement of the cathode channel plate of the fuel cell in FIG. 6. Like or corresponding constituent components are designated by the same numeral references through FIGS. 1 to 7.

The fuel cell 100 shown in FIG. 6 is configured so as to contain a plurality of units which are arranged on the same surface level as shown in FIG. 7. Not described concretely, each unit includes the membrane electrode assembly (MEA) containing the electrolyte membrane, the anode (anode catalytic layer and an anode gas diffusion layer) and the cathode (cathode catalytic layer and a cathode gas diffusion layer) which are opposite to one another via the electrolyte membrane, the anode channel plate 30 which is disposed adjacent to the membrane electrode assembly and functions as supplying a prescribed fuel to the anode, and the cathode channel plate 40 which is disposed opposite to the anode channel plate 30 via the membrane electrode assembly 8. One unit is defined by the membrane electrode assembly 8, the anode channel plate 30 and the cathode channel plate 40.

As shown in FIG. 3, the cathode channel plate 40 includes a platy member 41 which is disposed at the center in the width direction thereof and elongated along the long direction thereof, and a plurality of electrode plates 42 which are formed orthogonal to the platy member 41. The height of the platy member 41 is set equal to the heights of the electrode plates 42 so that the platy member 41 and the electrode plates 42 can be contacted with the membrane electrode assembly when the cathode channel plate 40 is incorporated in the unit of the fuel cell 100.

As shown in FIG. 7, air to be supplied to the cathode is taken in along the long direction of the cathode channel plate 40, and then, taken in along the width direction of the cathode channel plate 40 with the electrode plates 42 thereof. In this case, however, since the platy member 41 is provided in the cathode channel plate 40, the air can be retained in the cathode channel plate 40, not therethrough. Therefore, oxygen originated from the air is supplied to the cathode per unit in the fuel cell 100 in FIG. 1 through the diffusion of the oxygen in the cathode channel plate 40.

The supply of the oxygen to the cathode is conducted dominantly through the diffusion of the oxygen in the cathode channel plate 40. Therefore, if the concentration of the oxygen at the air inlet of the cathode channel plate 40 can be maintained similar to the concentration of oxygen in air by means of air blow with a fan or the like, no pump is required. As a result, the space for accommodating the pump is not required, and no noise and no electric power consumption, originated from the use of the pump, are not caused. In this embodiment, since the oxygen is supplied to the cathode through diffusion, the resultant moisture generated at the cathode is discharged from the cathode through diffusion. As a result, the cathode can be moisturized while the oxygen is supplied to the cathode so that the membrane electrode assembly contacting with the cathode channel path 40 can be also moisturized under no dry condition and thus, the performance of electric power generation in the fuel cell 100 can be stabilized.

Since the concrete structures of the membrane electrode assembly and the anode channel plate 30 can be configured as shown in the first embodiment and the second embodiment, explanation for the membrane electrode assembly and the anode channel plate 30 will be omitted.

In this embodiment, the electric power generated per unit is collected and taken out by the terminal (not shown) attached to the anode channel plate 30 and the terminal (not shown) attached to the cathode channel plate 40.

As the fuel to be supplied to the anode, hydrogen or liquid fuel such as methanol aqueous solution can be exemplified.

Although the present invention was described in detail with reference to the above examples, this invention is not limited to the above disclosure and every kind of variation and modification may be made without departing from the scope of the present invention.

In the embodiments, for example, the platy member 41 is provided in the cathode channel plate 40 at the center thereof in the width direction thereof so as to retain the air therein, but the cathode channel plate 40 can be configured as any structure only if the air can be retained so as to increase the fluid resistance of the air in the cathode channel plate 40. For example, the platy member 41 may be configured so as to be partially opened and thus, increase the fluid resistance of the air instead of perfectly shutting down the flow of the air. Concretely, some openings may be formed at the platy member 41.

In the embodiments, the fuel cell includes a plurality of units which are stacked one another, thereby constituting the stacking structure of the units so that the each unit includes the membrane electrode assembly 8, the anode channel plate 30 and the cathode channel plate 40, but may includes a single unit, not the stacking structure.

What is claimed is:
1. A fuel cell, comprising:
  a plurality of membrane electrode assemblies, each assembly containing an anode and a cathode which are disposed opposite to one another via an electrolytic membrane;
  a plurality of anode channel plates, each anode channel plate being adjacent to a corresponding anode of said plurality of membrane electrode assemblies and supplying a prescribed fuel to said corresponding anode thereof; and a plurality of cathode channel plates, each cathode channel plate being adjacent to a corresponding cathode of said plurality of membrane electrode assemblies, supplying air to said corresponding cathode, and containing a platy member which is provided integral with the cathode channel plate in a long direction different from a supplying direction of said air to said cathode and which extends away from said cathode channel plate towards said cathode, wherein a plurality of units are stacked one another, thereby constituting a stacking structure, each unit including said membrane electrode assembly, said anode channel plate and said cathode channel plate, and each cathode channel plate includes at least one electrode plate provided in contact with said corresponding cathode so that said air to be supplied is taken therein along said at least one electrode plate.

2. The fuel cell as set forth in claim 1, wherein said platy member is orthogonal to said at least one electrode plate so that said platy member and said at least one electrode plate can be arranged in comb-shape.

3. The fuel cell as set forth in claim 1, wherein said platy member is provided at a center of said cathode channel plate in a width direction thereof.

4. The fuel cell as set forth in claim 1, wherein said platy member and said at least one electrode plate function as electric collectors, respectively.

5. The fuel cell as set forth in claim 1, wherein a height of the platy member is set equal to a height of the electrode plate.

6. The fuel cell as set forth in claim 1, wherein the prescribed fuel for the anode is hydrogen or a methanol aqueous solution.

7. The fuel cell as set forth in claim 1, further comprising a fuel supplying member provided at one end of each of the units between adjacent anode channel plates.

8. A fuel cell, comprising:

a plurality of membrane electrode assemblies, each assembly containing an anode and a cathode which are disposed opposite to one another via an electrolytic membrane;

a plurality of anode channel plates, each anode channel plate being adjacent to a corresponding anode of said plurality of membrane electrode assemblies and supplying a prescribed fuel to said corresponding anode; and a plurality of cathode channel plates, each cathode channel plate being adjacent to a corresponding cathode of said plurality of membrane electrode assemblies, supplying air to said corresponding cathode, and containing a platy member which is provided integral with the cathode channel plate in a long direction different from a supplying direction of said air to said cathode and which extends away from said cathode channel plate towards said cathode, wherein a plurality of units are stacked one another, thereby constituting a stacking structure, each unit including said anode channel plate, said membrane electrode assemblies, said cathode channel plate, said membrane electrode assembly and said anode channel plate which are subsequently stacked, and each cathode channel plate includes at least one electrode plate provided in contact with said corresponding cathode so that said air to be supplied is taken therein along said at least one electrode plate.

9. The fuel cell as set forth in claim 8, wherein said platy member is orthogonal to said at least one electrode plate so that said platy member and said at least one electrode plate can be arranged in comb-shape.

10. The fuel cell as set forth in claim 8, wherein said platy member is provided at a center of said cathode channel plate in a width direction thereof.

11. The fuel cell as set forth in claim 8, wherein said platy member and said at least one electrode plate function as electric collectors, respectively.

12. The fuel cell as set forth in claim 8, wherein a height of the platy member is set equal to a height of the electrode plate.

13. The fuel cell as set forth in claim 8, wherein the prescribed fuel for the anode is hydrogen or a methanol aqueous solution.

14. The fuel cell as set forth in claim 8, further comprising a fuel supplying member provided at one end of each of the units between adjacent anode channel plates.

15. A fuel cell, comprising:

a plurality of membrane electrode assemblies, each assembly containing an anode and a cathode which are disposed opposite to one another via an electrolytic membrane;

a plurality of anode channel plates, each anode channel plate being adjacent to a corresponding one of said membrane electrode assemblies and supplying a prescribed fuel to a corresponding anode of said plurality of membrane electrode assemblies; and a plurality of cathode channel plates, each cathode channel plate being disposed opposite to a corresponding one of said plurality of anode channel plates via said corresponding one of said membrane electrode assemblies, supplying air to a corresponding cathode of said plurality of membrane electrode assemblies, and containing a platy member which is provided integral with the cathode channel plate in a long direction different from a supplying direction of said air to said cathode and which extends away from said cathode channel plate towards said cathode, wherein a plurality of units are arranged on the same surface level, each unit including said membrane electrode assembly, said anode channel plate and said cathode channel plate which are stacked, and each cathode channel plate includes at least one electrode plate provided in contact with said corresponding cathode so that said air to be supplied is taken therein along said at least one electrode plate.

16. The fuel cell as set forth in claim 15, wherein said platy member is orthogonal to said at least one electrode plate so that said platy member and said at least one electrode plate can be arranged in comb-shape.

17. The fuel cell as set forth in claim 15, wherein said platy member is provided at a center of said cathode channel plate in a width direction thereof.

18. The fuel cell as set forth in claim 15, wherein a height of the platy member is set equal to a height of the electrode plate.

19. The fuel cell as set forth in claim 15, wherein the prescribed fuel for the anode is hydrogen or a methanol aqueous solution.

20. The fuel cell as set forth in claim 15, further comprising a fuel supplying member provided at one end of each of the units between adjacent anode channel plates.

* * * * *